W. SMITH.
Revolving Grate for Cook-Stove.

No. 199,870.  Patented Jan. 29, 1878.

WITNESSES
Henry N. Miller
Frank Galt

INVENTOR
Wm Smith.
Alexander Mason
ATTORNEYS

N. PETERS, PHOTO-LITHOGRAPHER, WASHINGTON, D. C.

UNITED STATES PATENT OFFICE.

WILLIAM SMITH, OF CICERO, INDIANA, ASSIGNOR OF FOUR-FIFTHS OF HIS RIGHT TO WINFIELD S. ROLLINGS, HARRISON H. STOUT, ALBERT R. TUCKER, AND ELDRIDGE C. COOK, OF SAME PLACE.

IMPROVEMENT IN REVOLVING GRATES FOR COOK-STOVES.

Specification forming part of Letters Patent No. 199,870, dated January 29, 1878; application filed September 27, 1877.

*To all whom it may concern:*

Be it known that I, WILLIAM SMITH, of Cicero, in the county of Hamilton, and in the State of Indiana, have invented certain new and useful Improvements in Revolving Grates for Cook-Stoves; and do hereby declare that the following is a full, clear, and exact description thereof, reference being had to the accompanying drawings, and to the letters of reference marked thereon, making a part of this specification.

The nature of my invention consists in the construction of a cooking-stove with a revolving grate in the bottom of the oven, which is connected with a wheel, and with a crank upon the outside of the oven, whereby said grate is revolved during the process of baking, as will be hereinafter fully set forth.

In order that those skilled in the art may make and use my invention, I will proceed to describe its construction and operation.

Figure 1:
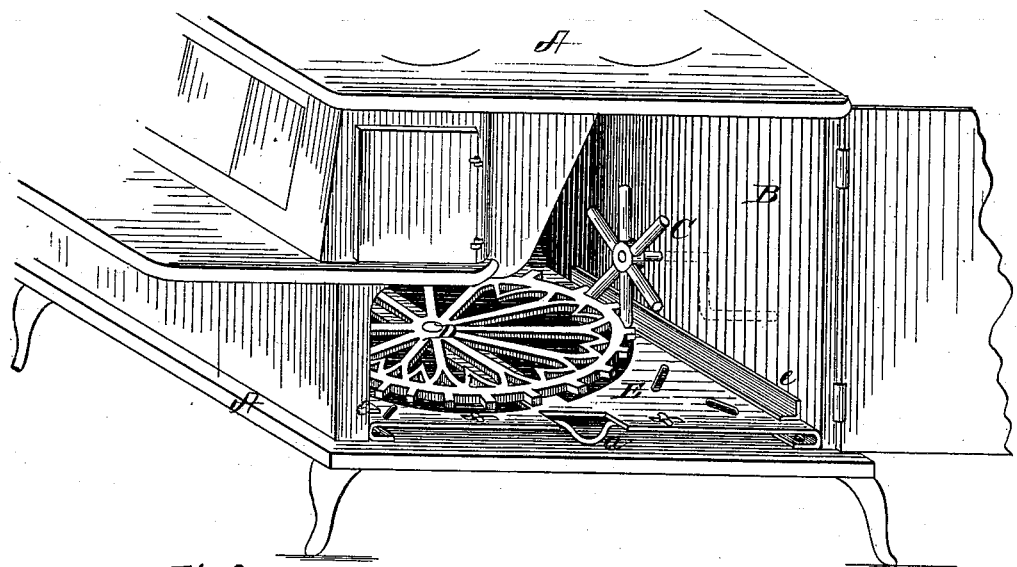
Figure 2:
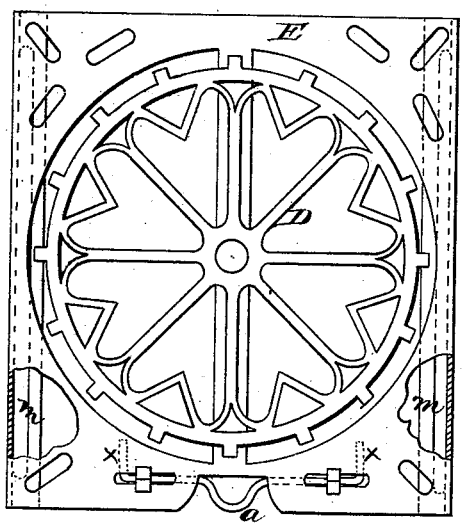

In the accompanying drawings, making part of this specification, Figure 1 represents a perspective view of my stove, showing interior of the oven; and Fig. 2 is a plan view of the grate and its frame.

In general construction my stove does not differ from those in general use, A representing the body, and B the oven of the stove.

Upon the bottom of the oven is placed a sliding frame, E. This frame is so constructed that it is slightly elevated from the bottom plate, and is confined in channels by means of the flanged plates e e on the sides of the oven.

The frame E may be so constructed with grooves upon its under side that it may be held in place by means of screw-heads or other similar devices for playing in said grooves.

A represents a handle to the frame E. This handle has feet at its ends, so that when partially revolved the feet stand under the end of the frame and support it. D represents a revolving grate, which is pivoted at its center to the upper side of frame E. This grate is provided upon its periphery with teeth similar to cogs. C represents a wheel, which is provided with arms, which engage with the teeth of the revolving grate and serve to revolve it. The wheel C is upon a horizontal shaft, which extends to the outside of the stove, and upon this shaft is a crank-handle, by means of which it is revolved.

It will readily be seen that when any article of food to be cooked is placed upon the grate D said grate may be revolved without opening the stove-doors, and thus more even baking is secured.

Having thus fully described my invention, what I claim as new, and desire to secure by Letters Patent, is—

The sliding frame E, carrying the revolving grate, said frame being provided with suitable ways for directing it and keeping it in place in the oven, as is herein fully set forth.

In testimony that I claim the foregoing I have hereunto set my hand this 31st day of May, 1877.

WILLIAM SMITH.

Witnesses:
 J. M. MASON,
 J. B. WILLITS.